US012621641B2

(12) United States Patent
Muñoz De La Torre Alonso et al.

(10) Patent No.: US 12,621,641 B2
(45) Date of Patent: May 5, 2026

(54) SERVICE FUNCTION CHAINING EXPOSURE IN 5G NETWORKS

(71) Applicant: Telefonaktiebolaget LM Ericsson (publ), Stockholm (SE)

(72) Inventors: Miguel Angel Muñoz De La Torre Alonso, Madrid (ES); Maria Luisa Mas Rosique, Tres Cantos (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 319 days.

(21) Appl. No.: 18/275,944

(22) PCT Filed: May 27, 2021

(86) PCT No.: PCT/EP2021/064174
§ 371 (c)(1),
(2) Date: Aug. 4, 2023

(87) PCT Pub. No.: WO2022/167106
PCT Pub. Date: Aug. 11, 2022

(65) Prior Publication Data
US 2024/0107282 A1     Mar. 28, 2024

(30) Foreign Application Priority Data
Feb. 5, 2021     (EP) .................................... 21382096

(51) Int. Cl.
*H04W 4/50* (2018.01)
*H04L 41/0893* (2022.01)
*H04W 8/24* (2009.01)

(52) U.S. Cl.
CPC ........... *H04W 4/50* (2018.02); *H04L 41/0893* (2013.01); *H04W 8/24* (2013.01)

(58) Field of Classification Search
CPC ..... H04W 12/06; H04W 12/08; H04W 40/20; H04W 36/22; H04W 40/02; H04W 8/08;
(Continued)

(56) References Cited

U.S. PATENT DOCUMENTS 11,206,531 B2 * 12/2021 Kim ........................ H04W 8/26
2018/0192390 A1     7/2018 Li et al.
(Continued)

FOREIGN PATENT DOCUMENTS

WO     2021017381 A1     2/2021

OTHER PUBLICATIONS

3rd Generation Partnership Project, "3rd Generation Partnership Project; Technical Specification Group Core Network and Terminals; 5G System; Network Exposure Function Northbound APIs; Stage 3 (Release 16)", Technical Specification, 3GPP TS 29.522 V16.5.0, Sep. 2020, pp. 1-161, 3GPP.
(Continued)

*Primary Examiner* — Dung Hong
(74) *Attorney, Agent, or Firm* — Sage Patent Group

(57) ABSTRACT

There is provided a computer-implemented method for enabling an Application Function (AF) to request User Plane capabilities of a Mobile Network Operator (MNO). The method comprises requesting, by the AF from a Network Exposure Function (NEF), one or more UP capability groups for a first application identifier (App-ID) and/or one or more UP capabilities for the first App-ID, providing, from the NEF to a network entity, information associated with the one or more UP capability groups for the first App-ID and/or one or more UP capabilities for the first App-ID, storing, at the network entity, the one or more UP capability groups for the first App-ID and/or one or more UP capabilities for the first App-ID; and providing an indication from the NEF to the AF to indicate that the request has been accepted.

17 Claims, 13 Drawing Sheets

(58) Field of Classification Search
CPC ..... H04W 28/0268; H04W 4/50; H04W 8/24;
H04L 41/0893
See application file for complete search history.

(56) References Cited

U.S. PATENT DOCUMENTS

| | | | |
|---|---|---|---|
| 2020/0053083 A1* | 2/2020 | Kunz .................... | H04W 12/72 |
| 2021/0282003 A1* | 9/2021 | Li ......................... | H04W 76/25 |
| 2022/0109633 A1* | 4/2022 | Li ......................... | H04W 48/08 |
| 2022/0150678 A1* | 5/2022 | Zhang .................. | H04L 47/283 |
| 2022/0225149 A1* | 7/2022 | Yan ........................ | G06F 9/547 |
| 2022/0263879 A1* | 8/2022 | Li ...................... | H04L 12/1407 |

OTHER PUBLICATIONS

3rd Generation Partnership Project, "3rd Generation Partnership Project; Technical Specification Group Services and System Aspects; Procedures for the 5G System (5GS); Stage 2 (Release 16)", Technical Specification, 3GPP TS 23.502 V16.7.1, Jan. 2021 pp. 1-603, 3GPP.

3rd Generation Partnership Project, "3rd Generation Partnership Project; Technical Specification Group Services and System Aspects; Study on Flexible Mobile Service Steering (FMSS) (Release 14)", Technical Report, 3GPP TR 22.808 V14.1.0, Dec. 2015, pp. 1-21, 3GPP.

3rd Generation Partnership Project, "3rd Generation Partnership Project; Technical Specification Group Services and System Aspects; Service aspects; Service principles (Release 18)", Technical Specification, 3GPP TS 22.101 V18.0.0, Dec. 2020, pp. 1-103, 3GPP.

* cited by examiner

Request UP capability group(s) and/or UP capability(ies)
for a first App-ID 210

Provide information associated with the UP capability
group(s) and/or UP capability(ies) 220

Store the UP capability group(s) and/or UP capability(ies) 230

Provide an indication to indicate that the request
has been accepted 240

Apparatus 300

| Processor 310 | Memory 320 |

Fig. 3

Receive a request for UP capability group(s) and/or
UP capability(ies) for a first App-ID 410

Provide information associated with the UP capability group(s)
and/or UP capability(ies) for the first App-ID 420

Provide an indication to indicate that the request
has been accepted 430

Apparatus 500

| Processor 510 | Memory 520 |

Fig. 5

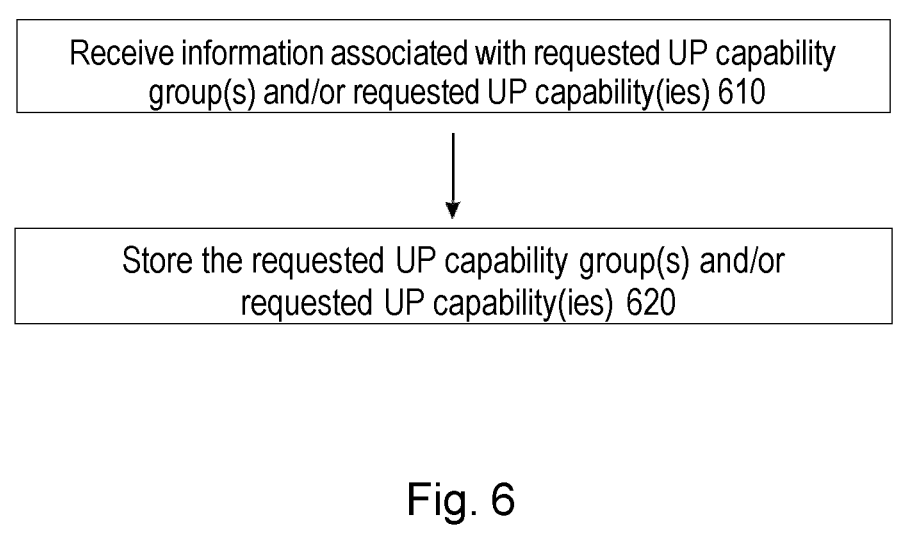

Receive information associated with requested UP capability group(s) and/or requested UP capability(ies) 610

Store the requested UP capability group(s) and/or requested UP capability(ies) 620

Fig. 6

Apparatus 700

Processor
710

Memory
720

Fig. 7

SERVICE FUNCTION CHAINING EXPOSURE IN 5G NETWORKS

TECHNICAL FIELD

The present disclosure relates to the field of traffic management in 5G networks. In particular, the present disclosure relates to methods and systems for enabling an Application Function to request User Plane capabilities of a Mobile Network Operator.

BACKGROUND

1 Reference Architecture

FIG. 1 shows the 5G reference architecture as defined by 3GPP. As shown in the drawing, the architecture includes a Network Exposure Function (NEF), a Unified Data Repository (UDR), a Policy Control Function (PCF), a Session Management Function (SMF), and a User Plane Function (UPF).

1.1 Network Exposure Function (NEF)

The Network Exposure Function (NEF) supports different functionalities. Specifically in the context of this disclosure, the NEF can support a set of Application Programming Interfaces (APIs) (e.g. Sponsored Data, Quality of Service (QoS), etc.) which allow a Content Provider to request policies from the Mobile Network Operator (MNO).

1.2 Unified Data Repository (UDR)

The Unified Data Repository (UDR) stores data grouped into distinct collections of subscription-related information, including Subscription Data, Policy Data, Structured Data for Exposure, and Application Data.

1.3 Policy Control Function (PCF)

The Policy Control Function (PCF) supports a unified policy framework to govern the network behaviour. Specifically, the PCF provides PCC (Policy and Charging Control) rules to the PCEF (Policy and Charging Enforcement Function), i.e. the Session Management Function (SMF)/User Plane Function (UPF) that enforces policy and charging decisions according to provisioned PCC rules.

1.4 Session Management Function (SMF)

The Session Management function (SMF) supports different functionalities, for example the SMF can receive PCC rules from the PCF and configure the UPF accordingly.

1.5 User Plane Function (UPF)

The User Plane function (UPF) supports handling of user plane traffic based on the rules received from the SMF, e.g. packet inspection and different enforcement actions such as traffic steering.

1.6 Service Function Chaining

The term service chaining refers to steering of traffic across a set of ordered set of network functions. Internet Engineering Task Force (IETF) has specified a solution for dynamic service chaining called Service Function Chaining which can be implemented by different technologies such as software-defined networking (SDN).

The service functions are deployed in the N6 reference point between UPF and the external packet data network. Examples of such service functions are Traffic Optimization appliances such as Transmission Control Protocol (TCP) optimizers or Hypertext Transfer Protocol (HTTP) proxies, Firewalls, traffic probes, Carrier-grade Network Address Translators (CGNATs) or Content Filtering control functions.

There is a new 3GPP Release18 Work Item proposed which is now under discussion: Support for Service Function Chaining in 5G System.

SUMMARY

In 3GPP Release 13, there was a study of FMSS (Flexible Mobile Service Steering) in 3GPP TR 22.808. In the study there are several use cases referring to the use of service function chaining beyond (S)Gi interface. However, during the normative phase, the only service requirements in TS22.101 are relate to traffic steering on the (S)Gi interface with the assumption that (S)Gi-LAN is "outside of the 3GPP scope".

Currently, TS 22.101 explicitly states that (S)Gi-LAN is "out of 3GPP scope", which by transitivity implies that N6-LAN is also "outside of 3GPP scope". Due to this, it is not possible to allow third parties to request utilisation of specific service function and service function chaining for their applications.

One aspect of the present disclosure provides a computer-implemented method for enabling an Application Function (AF) to request User Plane (UP) capabilities of a Mobile Network Operator (MNO). The method comprises: requesting, by the AF from a Network Exposure Function (NEF), at least one of: one or more UP capability groups for a first application identifier (App-ID), and one or more UP capabilities for the first App-ID; providing, from the NEF to a network entity, information associated with the at least one of: one or more UP capability groups for the first App-ID and one or more UP capabilities for the first App-ID; storing, at the network entity, the at least one of one or more UP capability groups for the first App-ID and one or more UP capabilities for the first App-ID; and providing an indication from the NEF to the AF to indicate that the request for the at least one of: one or more UP capability groups for the first App-ID and one or more UP capabilities for the first App-ID has been accepted.

Another aspect of the present disclosure provides a communication system configured to enable an AF to request UP capabilities of a MNO. The communication system comprises the AF, a NEF, and a network entity. The communication system is configured to: request, by the AF from the NEF, at least one of: one or more UP capability groups for a first App-ID, and one or more UP capabilities for the first App-ID; provide, from the NEF to the network entity, information associated with the at least one of: one or more UP capability groups for the first App-ID and one or more UP capabilities or the first App-ID; store, at the network entity, the provided at least one of one or more UP capability groups for the first App-ID and one or more UP capabilities for the first App-ID of the MNO; and provide an indication from the NEF to the AF to indicate that the request for the at least one of: one or more UP capability groups for the first App-ID and one or more UP capabilities for the first App-ID has been accepted.

Another aspect of the present disclosure provides an apparatus comprising a processor coupled with a memory, the memory comprising computer readable program instructions, that, when executed by the processor, cause the apparatus to: request, by an AF from a NEF, at least one of: one or more UP capability groups for a first App-ID, and one or more UP capabilities for the first App-ID; provide, from the NEF to a network entity, information associated with the at least one of: one or more UP capability groups for the first App-ID and one or more UP capabilities or the first App-ID; store, at the network entity, the provided at least one of one or more UP capability groups for the first App-ID and one or more UP capabilities for the first App-ID of the MNO; and provide an indication from the NEF to the AF to indicate that the request for the at least one of: one or more UP capability groups for the first App-ID and one or more UP capabilities for the first App-ID has been accepted.

Another aspect of the present disclosure provides a computer-implemented method at a NEF for enabling an AF to request UP capabilities of a MNO. The method comprises: receiving a request from the AF for at least one of: one or more UP capability groups for a first App-ID, and one or more UP capabilities for the first App-ID; providing, to a network entity, information associated with the at least one of: one or more UP capability groups for the first App-ID and one or more UP capabilities for the first App-ID; providing an indication to the AF to indicate that the request for the at least one of: one or more UP capability groups for the first App-ID and one or more UP capabilities for the first App-ID has been accepted, when the at least one of one or more UP capability groups for the first App-ID and one or more UP capabilities for the first App-ID is stored in the network entity.

Another aspect of the present disclosure provides an apparatus comprising a processor coupled with a memory, wherein the apparatus implements a NEF, and the memory comprises computer readable program instructions, that, when executed by the processor, cause the apparatus to: receive a request from an AF for at least one of: one or more UP capability groups for a first App-ID, and one or more UP capabilities for the first App-ID; provide, to a network entity, information associated with the at least one of: one or more UP capability groups for the first App-ID and one or more UP capabilities for the first App-ID; provide an indication to the AF to indicate that the request for the at least one of: one or more UP capability groups for the first App-ID and one or more UP capabilities for the first App-ID has been accepted, when the at least one of one or more UP capability groups for the first App-ID and one or more UP capabilities for the first App-ID is stored in the network entity.

Another aspect of the present disclosure provides a computer-implemented method at network entity for enabling an AF to request UP capabilities of a MNO. The method comprises: receiving, from a NEF, information associated with at least one of: one or more requested UP capability groups for the first App-ID and one or more requested UP capabilities for the first App-ID; and storing, the requested at least one of one or more UP capability groups for the first App-ID and one or more UP capabilities for the first App-ID.

Another aspect of the present disclosure provides an apparatus comprising a processor coupled with a memory, wherein the apparatus implements a network entity and the memory comprises computer readable program instructions, that, when executed by the processor, cause the apparatus to: receive, from a NEF, information associated with at least one of: one or more requested UP capability groups for the first App-ID and one or more requested UP capabilities for the first App-ID; and store, the requested at least one of one or more UP capability groups for the first App-ID and one or more UP capabilities for the first App-ID.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 3 is a block diagram of an apparatus for enabling an AF to request User Plane capabilities of a MNO, according to embodiments of the disclosure;

FIG. 5 is a block diagram of an apparatus for enabling an AF to request User Plane capabilities of a MNO, according to embodiments of the disclosure;

FIG. 6 is a flowchart illustrating a computer-implemented method at a network entity for enabling an Application Function to request User Plane capabilities of a Mobile Network Operator, according to embodiments of the disclosure;

FIG. 7 is a block diagram of an apparatus for enabling an AF to request User Plane capabilities of a MNO, according to embodiments of the disclosure;

DETAILED DESCRIPTION

Embodiments described herein relate to methods and systems based on an extension of the Nnef northbound interface with a new API which allows the Content Provider to request, configure, and control the user plane capabilities (e.g. a chain of service functions in the N6-LAN) both on a per application and on a per user session basis.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Figure 1:
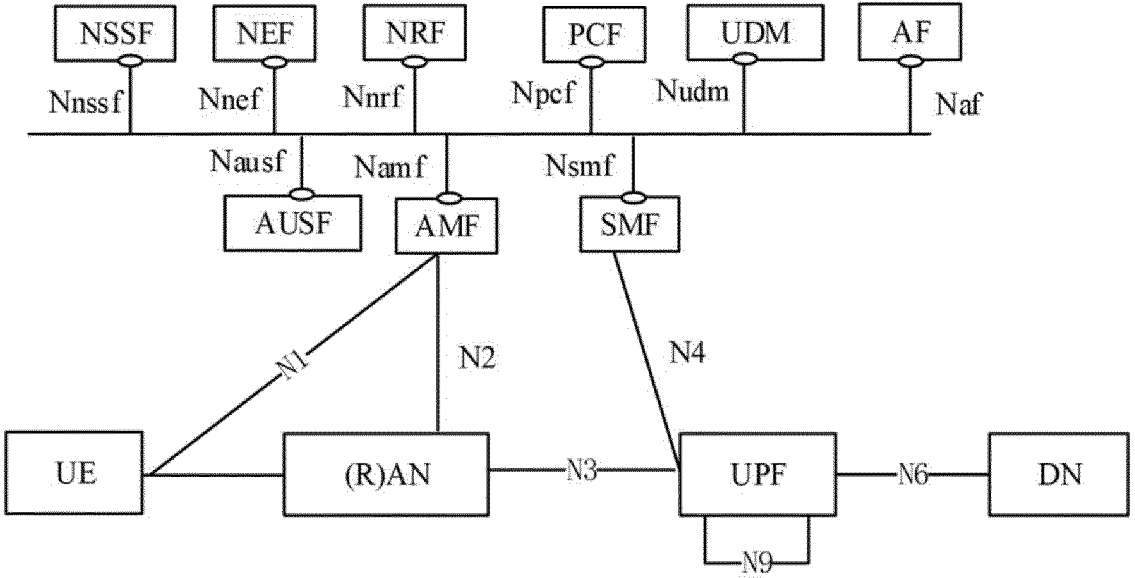
FIG. 1 shows the 5G reference architecture as defined by 3GPP.
Figure 2:
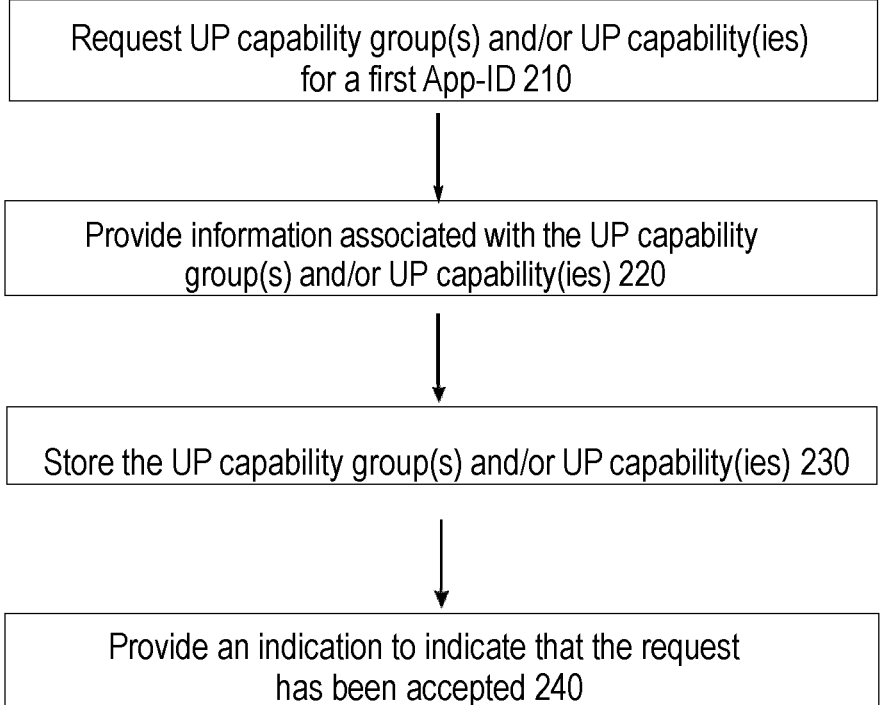
FIG. 2 is a flowchart illustrating a computer-implemented method for enabling an Application Function to request User Plane capabilities of a Mobile Network Operator, according to embodiments of the disclosure.

FIG. 2 is a flowchart illustrating a computer-implemented method for enabling an Application Function (AF) to request User Plane capabilities of a Mobile Network Operator (MNO), according to embodiments of the disclosure. The illustrated method can generally be performed by or under the control of a processor, such as the processor 310 of the apparatus 300 as will be described below with reference to FIG. 3. The illustrated method can also be performed by or under the control of a communication system.

With reference to FIG. 2, in step 210, at least one of: one or more UP capability groups for a first application identifier (App-ID), and one or more UP capabilities for the first App-ID is requested by the AF from a Network Exposure Function (NEF).

Subsequently, in step 220, information associated with the at least one of: one or more UP capability groups for the first App-ID and one or more UP capabilities for the first App-ID is provided from the NEF to a network entity. The network entity may be a Unified Data Repository (UDR) in some embodiments.

In step 230, the at least one of one or more UP capability groups for the first App-ID and one or more UP capabilities for the first App-ID is stored at the network entity.

Returning to FIG. 2, in step 240, an indication to indicate that the request for the at least one of: one or more UP capability groups for the first App-ID and one or more UP capabilities for the first App-ID has been accepted is provided from the NEF to the AF.

In some embodiments, requesting at least one of: one or more UP capability groups for the first App-ID and one or more UP capabilities for the first App-ID by the AF in step 210 may comprise triggering a provision request message from the AF to the NEF, the provision request message including an identifier of the AF, a list of target App-IDs, and at least one of: the requested one or more UP capability groups for the first App-ID, and a predetermined set of UP capabilities. The provision request message may further include identifiers of one or more users to which the provision request applies.

In some embodiments, prior to requesting the one or more UP capability groups for the first App-ID and/or the one or more UP capabilities for the first App-ID in step 210, the method may further comprise:

requesting, by the AF, information associated with at least one of: available UP capability groups and available UP capabilities;

retrieving, from the network entity by the NEF, information associated with at least one of: available UP capability groups and available UP capabilities upon the request by the AF; and providing, from the NEF to the AF, the information associated with the at least one of: available UP capability groups and available UP capabilities.

Moreover, in these embodiments, prior to requesting information associated with at least one of: available UP capability groups and available UP capabilities, the method may further comprise: storing, at the network entity, the at least one of available UP capability groups and available UP capabilities by providing a first storage request message to the network entity.

The first storage request message may comprise the at least one of: one or more available UP capability groups and one or more available UP capabilities for each of one or more App-IDs. In some embodiments, the first storage request message may further comprise information indicating which of the one or more available UP capability groups and/or one or more available UP capabilities is suitable for exposure to third parties. In some embodiments, the first storage request message may further comprise user identifier for each of the at least one of: one or more available UP capability groups and one or more available UP capabilities.

In some embodiments, the provided at least one of one or more available UP capability groups and one or more available UP capabilities may be stored at the network entity as Application Data.

In some embodiments, the available supported UP capabilities may be categorised into groups. For example, even though typically a UP capability is of a certain Service Function (SF) type (e.g. TCP Optimizer SF), UP capabilities in some embodiments may not be of certain SF type, but rather a certain SF category (e.g. Optimizer SF category, which might include TCP Optimizer SF type, QUIC Optimizer SF and/or Video Optimizer SF).

Subsequent to storing the at least one of: one or more available UP capability groups and one or more available UP capabilities in these embodiments, the method may further comprise providing an indication from the network entity to indicate that the storage has been successfully performed.

In some embodiments, prior to requesting information associated with available UP capability groups and available UP capabilities, the method may further comprise registering, at a Network Function Repository Function (NRF), the at least one of: one or more available UP capability groups and one or more available UP capabilities on a per App-ID basis. Registering the at least one of: one or more available UP capability groups and one or more available UP capabilities on a per App-ID basis may comprise:

triggering, from a User Plane Function (UPF) to the NRF, a registration message, the registration message including an identifier of the UPF (UPF-ID), the at least one of: one or more available UP capability groups and one or more available UP capabilities, and an App-ID associated with each of the at least one of: one or more available UP capability groups and one or more available UP capabilities;

storing, at the NRF, the at least one of: one or more available UP capability groups and one or more available UP capabilities on a per App-ID basis; and providing, from the NRF to the UPF, an indication to indicate that the storage has been successfully performed.

In some embodiments, requesting information associated with at least one of: available supported UP capability groups and available UP capabilities may comprise triggering a fetch request message from the AF to the NEF. The fetch request message may include an identifier of the AF. In some embodiments, the fetch request message may further include at least one of: one or more target App-IDs and identifiers of one or more users to which the fetch request applies. Moreover, in some embodiments, retrieval of the requested information by the NEF may be based on the at least one of: one or more target App-IDs and identifiers of one or more users to which the fetch request applies in the fetch request message.

In some embodiments, retrieving the information associated with available UP capability groups and available UP capabilities from the network entity may comprise:

triggering a query request message from the NEF to the network entity, the query request message including an indication to retrieve the information associated with available UP capability groups and available UP capabilities; and providing, in a query response message, the information associated with available UP capability groups and available UP capabilities from the network entity to the NEF.

In these embodiments, providing the information associated with available UP capability groups and available UP capabilities from the network entity to the NEF may be based on the at least one of one or more target App-IDs and identifiers of one or more users to which the fetch request applies in the fetch request message. Alternatively or in addition, providing the information associated with available UP capability groups and available UP capabilities from the network entity to the NEF may be based on the information indicating which of the one or more available UP capability groups and/or one or more available UP capabilities is suitable for exposure to third parties.

In some embodiments, the information associated with available supported UP capabilities may include a list of available service functions, and one or more available configuration options for each of the plurality of available service functions. The one or more available configuration options may be associated with at least one of: a type of service function, and a traffic management action.

In some embodiments, the information associated with available supported UP capability groups may include a list of available service chains, each of the available service chains being represented by a chain identifier (Chain-ID), and each available service chain may be a combination of ordered service functions.

In some embodiments, prior to providing an indication to indicate that the request for the at least one of: one or more UP capability groups for a first App-ID and one or more UP capabilities for the first App-ID has been accepted in step 240:

determining that the available supported UP capability groups and/or available supported UP capabilities currently stored in the network entity do not support the first App-ID;

programming, by the MNO, a new UP capability group according to the request by the AF; and storing the new UP capability group in the network entity.
   Although not shown in FIG. 2, in some embodiments the method may further comprise establishing a Packet Data Unit (PDU) session for a target user. In these embodiments, establishing the PDU session may comprise configuring User Session Context to include the requested at least one of: one or more UP capability groups for the first App-ID and one or more UP capabilities for the first App-ID.

Although not shown in FIG. 2, in some embodiments the method may further comprise updating User Session Context of an ongoing Packet Data Unit (PDU) session to include the requested at least one of: one or more UP capability groups for the first App-ID and one or more UP capabilities for the first App-ID.

In some embodiments, the method may further comprise storing, at the network entity, identifying information of the AF.

In some embodiments, storing identifying information of the AF and/or the requested at least one of: one or more UP capability groups for the first App-ID and one or more UP capabilities for the first App-ID may comprise:

providing a second storage request message from the NEF to the network entity, the second storage request message including the identifying information of the AF and/or the request at least one of: one or more UP capability groups for the first App-ID and one or more UP capabilities for the first App-ID; and providing an indication from the network entity to the NEF to indicate that the storage has been successfully performed.

It will be appreciated that although the steps in the method illustrated in FIG. 2 have been described as being performed sequentially, in some embodiments at least some of the steps in the illustrated method may be performed in a different order, and/or at least some of the steps in the illustrated method may be performed simultaneously. Also, in some embodiments, there may be provided a system configured to perform the method as explained above with reference to FIG. 2.

There is also provided a communication system configured to enable an AF to request User Plane capabilities of a MNO, the communication system comprising the AF, a NEF, and a network entity. The communication system is configured to perform the method as described above with reference to FIG. 2.

Figure 3:
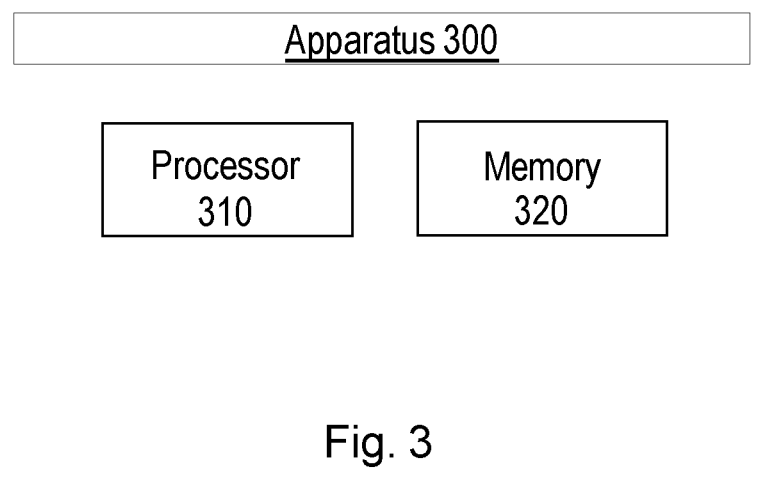

FIG. 3 is a block diagram of an apparatus for enabling an AF to request User Plane capabilities of a MNO, according to embodiments of the disclosure. The apparatus 300 comprises a processor 310 coupled with a memory 320.

In the present embodiment, the memory 320 comprises computer readable program instructions that, when executed by the processor 310, cause the apparatus 300 to request, by the AF from a NEF, at least one of: one or more UP capability groups for a first App-ID, and one or more UP capabilities for the first App-ID.

The apparatus 300 is further caused to provide, from the NEF to a network entity, information associated with the at least one of: one or more UP capability groups for the first App-ID and one or more UP capabilities or the first App-ID, and to store, at the network entity, the provided at least one of one or more UP capability groups for the first App-ID and one or more UP capabilities for the first App-ID of the MNO.

The apparatus 300 is further caused to provide an indication from the NEF to the AF to indicate that the request for the at least one of: one or more UP capability groups for the first App-ID and one or more UP capabilities for the first App-ID has been accepted.

In some embodiments, the apparatus 300 may be caused to request at least one of: one or more UP capability groups for the first App-ID and one or more UP capabilities for the first App-ID by the AF by: triggering a provision request message from the AF to the NEF, the provision request message including an identifier of the AF, a list of target App-IDs, and at least one of: the requested one or more UP capability groups for the first App-ID, and a predetermined set of UP capabilities. The provision request message may further include identifiers of one or more users to which the provision request applies.

In some embodiments, the apparatus 300 may be further caused to, prior to requesting the one or more UP capability groups for the first App-ID and/or the one or more UP capabilities for the first App-ID:

request, by the AF, information associated with at least one of: available UP capability groups and available UP capabilities;

retrieve, from the network entity by the NEF, information associated with at least one of: available UP capability groups and available UP capabilities upon the request by the AF; and provide, from the NEF to the AF, the information associated with the at least one of: available UP capability groups and available UP capabilities.

Moreover, in these embodiments, prior to requesting information associated with at least one of: available UP capability groups and available UP capabilities, the apparatus 300 may be caused to store, at the network entity, the at least one of available UP capability groups and available UP capabilities by providing a first storage request message to the network entity.

The first storage request message may comprise the at least one of: one or more available UP capability groups and one or more available UP capabilities for each of one or more App-IDs. In some embodiments, the first storage request message may further comprise information indicating which of the one or more available UP capability groups and/or one or more available UP capabilities is suitable for exposure to third parties. In some embodiments, the first storage request message may further comprise user identifier for each of the at least one of: one or more available UP capability groups and one or more available UP capabilities.

In some embodiments, the provided at least one of one or more available UP capability groups and one or more available UP capabilities may be stored at the network entity as Application Data.

In some embodiments, the available supported UP capabilities may be categorised into groups. For example, even though typically a UP capability is of a certain Service Function (SF) type (e.g. TCP Optimizer SF), UP capabilities in some embodiments may not be of certain SF type, but rather a certain SF category (e.g. Optimizer SF category, which might include TCP Optimizer SF type, QUIC Optimizer SF and/or Video Optimizer SF).

Subsequent to storing the at least one of: one or more available UP capability groups and one or more available UP capabilities in these embodiments, the apparatus 300 may be caused to provide an indication from the network entity to indicate that the storage has been successfully performed.

In some embodiments, prior to requesting information associated with available UP capability groups and available UP capabilities, the apparatus 300 may be further caused to register, at a Network Function Repository Function (NRF), the at least one of: one or more available UP capability groups and one or more available UP capabilities on a per App-ID basis. The apparatus 300 may be caused to register the at least one of: one or more available UP capability groups and one or more available UP capabilities on a per App-ID basis by:

triggering, from a User Plane Function (UPF) to the NRF, a registration message, the registration message including an identifier of the UPF (UPF-ID), the at least one of: one or more available UP capability groups and one or more available UP capabilities, and an App-ID associated with each of the at least one of: one or more available UP capability groups and one or more available UP capabilities;

storing, at the NRF, the at least one of: one or more available UP capability groups and one or more available UP capabilities on a per App-ID basis; and providing, from the NRF to the UPF, an indication to indicate that the storage has been successfully performed.

In some embodiments, the apparatus 300 may be caused to request information associated with at least one of: available supported UP capability groups and available UP capabilities by triggering a fetch request message from the AF to the NEF. The fetch request message may include an identifier of the AF. In some embodiments, the fetch request message may further include at least one of: one or more target App-IDs and identifiers of one or more users to which the fetch request applies. Moreover, in some embodiments, retrieval of the requested information by the NEF at the apparatus 300 may be based on the at least one of: one or more target App-IDs and identifiers of one or more users to which the fetch request applies in the fetch request message.

In some embodiments, the apparatus 300 may be caused to retrieve the information associated with available UP capability groups and available UP capabilities from the network entity by:

triggering a query request message from the NEF to the network entity, the query request message including an indication to retrieve the information associated with available UP capability groups and available UP capabilities; and providing, in a query response message, the information associated with available UP capability groups and available UP capabilities from the network entity to the NEF.

In these embodiments, the apparatus 300 may be caused to provide the information associated with available UP capability groups and available UP capabilities from the network entity to the NEF based on the at least one of one or more target App-IDs and identifiers of one or more users to which the fetch request applies in the fetch request message. Alternatively or in addition, the apparatus 300 may be caused to provide the information associated with available UP capability groups and available UP capabilities from the network entity to the NEF based on the information indicating which of the one or more available UP capability groups and/or one or more available UP capabilities is suitable for exposure to third parties.

In some embodiments, the information associated with available supported UP capabilities may include a list of available service functions, and one or more available configuration options for each of the plurality of available service functions. Furthermore, the one or more available configuration options may be associated with at least one of: a type of service function, and a traffic management action.

In some embodiments, the information associated with available supported UP capability groups may include a list of available service chains, each of the available service chains being represented by a Chain-ID, and each available service chain may be a combination of ordered service functions.

In some embodiments, the apparatus 300 may be caused to, prior to providing an indication to indicate that the request for the at least one of: one or more UP capability groups for a first App-ID and one or more UP capabilities for the first App-ID has been accepted:

determine that the available supported UP capability groups and/or available supported UP capabilities currently stored in the network entity do not support the first App-ID;

programme, by the MNO, a new UP capability group according to the request by the AF; and store the new UP capability group in the network entity.

In some embodiments, the apparatus 300 may be further caused to establish a PDU session for a target user. In these embodiments, the apparatus 300 may be caused to establishing the PDU session by configuring User Session Context to include the requested at least one of: one or more UP capability groups for the first App-ID and one or more UP capabilities for the first App-ID.

In some embodiments, the apparatus 300 may be further caused to update User Session Context of an ongoing PDU session to include the requested at least one of: one or more UP capability groups for the first App-ID and one or more UP capabilities for the first App-ID.

In some embodiments, the apparatus 300 may be further caused to store, at the network entity, identifying information of the AF. The apparatus 300 may be further caused to store identifying information of the AF and/or the requested at least one of: one or more UP capability groups for the first App-ID and one or more UP capabilities for the first App-ID by:

providing a second storage request message from the NEF to the network entity, the second storage request message including the identifying information of the AF and/or the request at least one of: one or more UP capability groups for the first App-ID and one or more UP capabilities for the first App-ID; and providing an indication from the network entity to the NEF to indicate that the storage has been successfully performed.

It will be appreciated that FIG. 3 only shows the components required to illustrate an aspect of the apparatus 300 and, in a practical implementation, the apparatus 300 may comprise alternative or additional components to those shown.

Any appropriate steps, methods, or functions may be performed through a computer program product that may, for example, be executed by the components and equipment illustrated in the figure above. For example, there may be provided a storage or a memory at the apparatus 300 (or the communication system) that may comprise non-transitory computer readable means on which a computer program can be stored. The computer program may include instructions which cause the components of the apparatus 300 (or the communication system or any operatively coupled entities and devices) to execute methods according to embodiments described herein. The computer program and/or computer program product may thus provide means for performing any steps herein disclosed.

Figure 4:
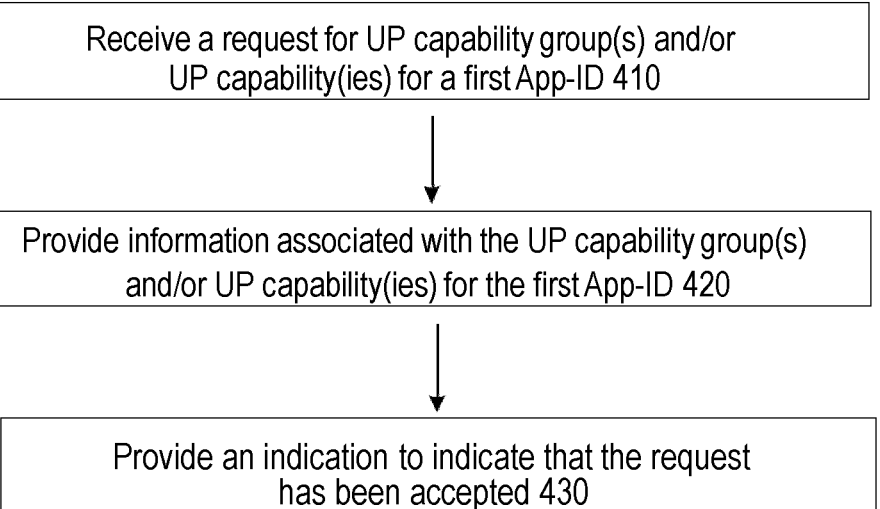
FIG. 4 is a flowchart illustrating a computer-implemented method at a Network Exposure Function for enabling an AF to request User Plane capabilities of a MNO, according to embodiments of the disclosure.

FIG. 4 is a flowchart illustrating a computer-implemented method at a NEF for enabling an AF to request User Plane capabilities of a MNO, according to embodiments of the disclosure. The illustrated method can generally be performed by or under the control of a processor, such as the processor 510 of the apparatus 500 as will be described below with reference to FIG. 5. The illustrated method can also be performed by or under the control of a communication system.

With reference to FIG. 4, in step 410 a request for at least one of: one or more UP capability groups for a first App-ID, and one or more UP capabilities for the first App-ID is received from the AF.

In some embodiments, step 410 may comprise receiving a provision request message from the AF, the provision request message including an identifier of the AF, a list of target App-IDs, and at least one of: the requested one or more UP capability groups for the first App-ID, and a predetermined set of UP capabilities. In these embodiments, the provision request message may further include identifiers of one or more users to which the provision request applies.

Returning to FIG. 4, in step 420, information associated with the at least one of: one or more UP capability groups for the first App-ID and one or more UP capabilities for the first App-ID is provided to a network entity. The network entity may be a Unified Data Repository (UDR).

Subsequently, in step 430, an indication is provided to the AF to indicate that the request for the at least one of: one or more UP capability groups for the first App-ID and one or more UP capabilities for the first App-ID has been accepted, when the at least one of one or more UP capability groups for the first App-ID and one or more UP capabilities for the first App-ID is stored in the network entity.

In some embodiments, prior to requesting the one or more UP capability groups for the first App-ID and/or the one or more UP capabilities for the first App-ID in step 410, the method may further comprise:

retrieving, from the network entity, information associated with at least one of: available UP capability groups and available UP capabilities upon a request by the AF; and providing, to the AF, the information associated with the at least one of: available UP capability groups and available UP capabilities.

In some embodiments, the request from the AF for information associated with at least one of: available UP capability groups and available UP capabilities may include a fetch request message from the AF, the fetch request message further including an identifier of the AF. In some embodiments, the fetch request message may further include at least one of: one or more target App-IDs and identifiers of one or more users to which the fetch request applies.

The information associated with available supported UP capabilities may include a list of available service functions, and one or more available configuration options for each of the plurality of available service functions. The one or more available configuration options may be associated with at least one of: a type of service function, and a traffic management action.

In some embodiments, the available supported UP capabilities may be categorised into groups. For example, even though typically a UP capability is of a certain Service Function (SF) type (e.g. TCP Optimizer SF), UP capabilities in some embodiments may not be of certain SF type, but rather a certain SF category (e.g. Optimizer SF category, which might include TCP Optimizer SF type, QUIC Optimizer SF and/or Video Optimizer SF).

In some embodiments, the information associated with available supported UP capability groups may include a list of available service chains, each of the available service chains being represented by a Chain-ID, and each available service chain may be a combination of ordered service functions.

In some embodiments, retrieving the requested information associated with at least one of: available UP capability groups and available UP capabilities may be based on the at least one of: one or more target App-IDs and identifiers of one or more users to which the fetch request applies in the fetch request message. Also, in some embodiments, retrieving the information associated with available UP capability groups and available UP capabilities from the network entity may comprise:

triggering a query request message to the network entity, the query request message including an indication to retrieve the information associated with available UP capability groups and available UP capabilities; and receiving, in a query response message, the information associated with available UP capability groups and available UP capabilities from the network entity.

In some embodiments, the method may further comprise providing a second storage request message to the network entity, the second storage request message including the identifying information of the AF and/or the request at least one of: one or more UP capability groups for the first App-ID and one or more UP capabilities for the first App-ID, and receiving an indication from the network entity that indicates that the storage has been successfully performed.

It will be appreciated that although the steps in the method illustrated in FIG. 4 have been described as being performed sequentially, in some embodiments at least some of the steps in the illustrated method may be performed in a different order, and/or at least some of the steps in the illustrated method may be performed simultaneously. Also, in some embodiments, there may be provided a system configured to perform the method as explained above with reference to FIG. 4.

Figure 5:
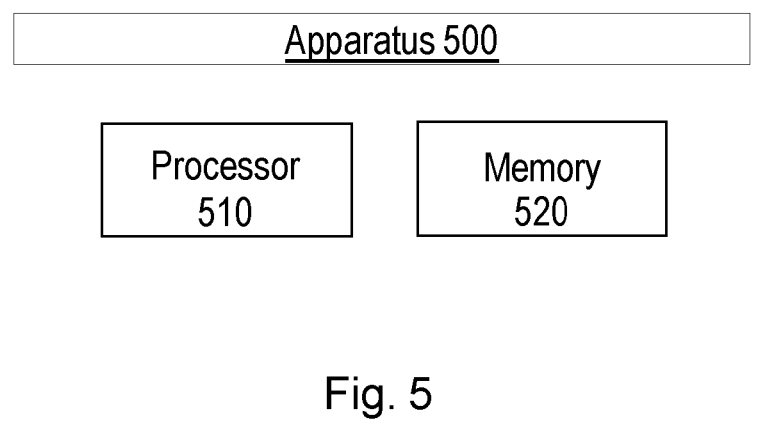

FIG. 5 is a block diagram of an apparatus for enabling an AF to request User Plane capabilities of a MNO, according to embodiments of the disclosure. The apparatus 500 comprises a processor 510 coupled with a memory 520.

In the present embodiment, the apparatus 500 implements a NEF, and the memory 520 comprises computer readable program instructions, that, when executed by the processor, cause the apparatus 500 to: receive, from the AF, a request for at least one of: one or more UP capability groups for a first App-ID, and one or more UP capabilities for the first App-ID. In some embodiments, this may include receiving a provision request message from the AF, the provision request message including an identifier of the AF, a list of target App-IDs, and at least one of: the requested one or more UP capability groups for the first App-ID, and a predetermined set of UP capabilities. Moreover, in these embodiments, the provision request message may further include identifiers of one or more users to which the provision request applies.

The apparatus 500 is further caused to provide information associated with the at least one of: one or more UP capability groups for the first App-ID and one or more UP capabilities for the first App-ID to a network entity. The network entity may be a Unified Data Repository (UDR).

The apparatus 500 is further caused to provide an indication to the AF to indicate that the request for the at least one of: one or more UP capability groups for the first App-ID and one or more UP capabilities for the first App-ID has been accepted, when the at least one of one or more UP capability groups for the first App-ID and one or more UP capabilities for the first App-ID is stored in the network entity.

In some embodiments, prior to requesting the one or more UP capability groups for the first App-ID and/or the one or more UP capabilities for the first App-ID, the apparatus 500 may be caused to:

retrieve, from the network entity, information associated with at least one of: available UP capability groups and available UP capabilities upon a request by the AF; and provide, to the AF, the information associated with the at least one of: available UP capability groups and available UP capabilities.

In some embodiments, the request from the AF for information associated with at least one of: available UP capability groups and available UP capabilities may include a fetch request message from the AF, the fetch request message further including an identifier of the AF. In some embodiments, the fetch request message may further include at least one of: one or more target App-IDs and identifiers of one or more users to which the fetch request applies.

The information associated with available supported UP capabilities may include a list of available service functions, and one or more available configuration options for each of the plurality of available service functions. The one or more available configuration options may be associated with at least one of: a type of service function, and a traffic management action. In some embodiments, the available supported UP capabilities may be categorised into groups. For example, even though typically a UP capability is of a certain Service Function (SF) type (e.g. TCP Optimizer SF), UP capabilities in some embodiments may not be of certain SF type, but rather a certain SF category (e.g. Optimizer SF category, which might include TCP Optimizer SF type, QUIC Optimizer SF and/or Video Optimizer SF).

In some embodiments, the information associated with available supported UP capability groups may include a list of available service chains, each of the available service chains being represented by a Chain-ID, and each available service chain may be a combination of ordered service functions.

In some embodiments, the apparatus 500 may be caused to retrieve the requested information associated with at least one of: available UP capability groups and available UP capabilities based on the at least one of: one or more target App-IDs and identifiers of one or more users to which the fetch request applies in the fetch request message. Also, in some embodiments, the apparatus 500 may be caused to retrieve the information associated with available UP capability groups and available UP capabilities from the network entity by:

triggering a query request message to the network entity, the query request message including an indication to retrieve the information associated with available UP capability groups and available UP capabilities; and receiving, in a query response message, the information associated with available UP capability groups and available UP capabilities from the network entity.

In some embodiments, the apparatus 500 may be further caused to provide a second storage request message to the network entity, the second storage request message including the identifying information of the AF and/or the request at least one of: one or more UP capability groups for the first App-ID and one or more UP capabilities for the first App-ID, and receive an indication from the network entity that indicates that the storage has been successfully performed.

It will be appreciated that FIG. 5 only shows the components required to illustrate an aspect of the apparatus 500 and, in a practical implementation, the apparatus 500 may comprise alternative or additional components to those shown.

Any appropriate steps, methods, or functions may be performed through a computer program product that may, for example, be executed by the components and equipment illustrated in the figure above. For example, there may be provided a storage or a memory at the apparatus 500 that may comprise non-transitory computer readable means on which a computer program can be stored. The computer program may include instructions which cause the components of the apparatus 500 (or any operatively coupled entities and devices) to execute methods according to embodiments described herein. The computer program and/or computer program product may thus provide means for performing any steps herein disclosed.

FIG. 6 is a flowchart illustrating a computer-implemented method at a network entity for enabling an AF to request User Plane capabilities of a MNO, according to embodiments of the disclosure. The illustrated method can generally be performed by or under the control of a processor, such as the processor 710 of the apparatus 700 as will be described below with reference to FIG. 7. The illustrated method can also be performed by or under the control of a communication system. In some embodiments, the network entity may be a UDR.

With reference to FIG. 6, in step 610 information associated with at least one of: one or more requested UP capability groups for the first App-ID and one or more requested UP capabilities for the first App-ID is received from a NEF.

Then, in step 620, the requested at least one of one or more UP capability groups for the first App-ID and one or more UP capabilities for the first App-ID is stored.

In some embodiments, prior to steps 610 and 620, the method may further comprise providing, to the NEF, information associated with at least one of: available UP capability groups and available UP capabilities upon a request by the AF to the NEF. In these embodiments, providing the information associated with available UP capability groups and available UP capabilities from the network entity comprises:

receiving a query request message from the NEF, the query request message including an indication to retrieve the information associated with available UP capability groups and available UP capabilities; and providing, in a query response message, the information associated with available UP capability groups and available UP capabilities from the network entity to the NEF.

In some embodiments, providing the information associated with available UP capability groups and available UP capabilities to the NEF may be based on the at least one of one or more target App-IDs and identifiers of one or more users to which a fetch request from the AF applies. Also, in some embodiments, providing the information associated with available UP capability groups and available UP capabilities to the NEF may be based on the information indicating which of the one or more available UP capability groups and/or one or more available UP capabilities is suitable for exposure to third parties.

Furthermore, prior to providing information associated with at least one of: available UP capability groups and available UP capabilities, the method may further comprise: receiving a first storage request message which comprises the at least one of: one or more available UP capability groups and one or more available UP capabilities for each of one or more App-IDs, and storing the at least one of available UP capability groups and available UP capabilities (e.g. as Application Data). In some embodiments, the first storage request message may further comprise information indicating which of the one or more available UP capability groups and/or one or more available UP capabilities is suitable for exposure to third parties. Furthermore, the first storage request message may further comprise user identifier for each of the at least one of: one or more available UP capability groups and one or more available UP capabilities.

In some embodiments, subsequent to storing the at least one of: one or more available UP capability groups and one or more available UP capabilities, the method may further comprise providing an indication to indicate that the storage has been successfully performed.

In some embodiments, the information associated with available supported UP capabilities may include a list of available service functions, and one or more available configuration options for each of the plurality of available service functions. In some embodiments, the one or more available configuration options may be associated with at least one of: a type of service function, and a traffic management action. In some embodiments, the available supported UP capabilities may be categorised into groups. For example, even though typically a UP capability is of a certain Service Function (SF) type (e.g. TCP Optimizer SF), UP capabilities in some embodiments may not be of certain SF type, but rather a certain SF category (e.g. Optimizer SF category, which might include TCP Optimizer SF type, QUIC Optimizer SF and/or Video Optimizer SF).

In some embodiments, the information associated with available supported UP capability groups may include a list of available service chains, each of the available service chains being represented by a Chain-ID, and each available service chain may be a combination of ordered service functions.

In some embodiments, the method may further comprise storing identifying information of the AF.

In some embodiments, storing identifying information of the AF and/or the requested at least one of: one or more UP capability groups for the first App-ID and one or more UP capabilities for the first App-ID may comprise:

receiving a second storage request message from the NEF, wherein the second storage request message including the identifying information of the AF and/or the request at least one of: one or more UP capability groups for the first App-ID and one or more UP capabilities for the first App-ID; and providing an indication to the NEF to indicate that the storage has been successfully performed.

It will be appreciated that although the steps in the method illustrated in FIG. 6 have been described as being performed sequentially, in some embodiments at least some of the steps in the illustrated method may be performed in a different order, and/or at least some of the steps in the illustrated method may be performed simultaneously. Also, in some embodiments, there may be provided a system configured to perform the method as explained above with reference to FIG. 6.

Figure 7:
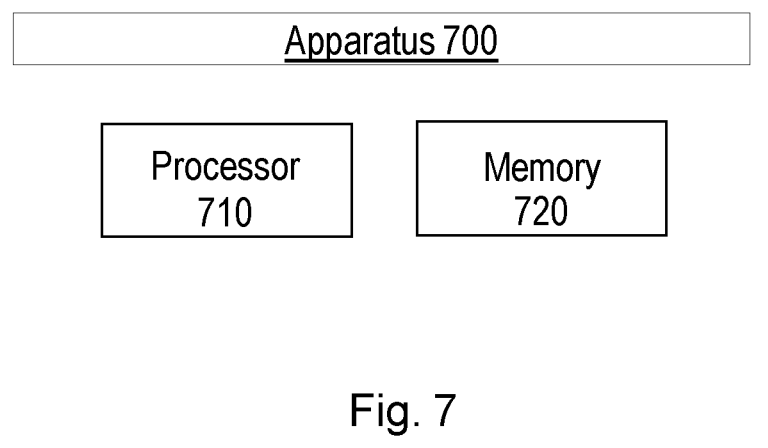

FIG. 7 is a block diagram of an apparatus for enabling an AF to request UP capabilities of a MNO, according to embodiments of the disclosure. The apparatus 700 comprises a processor 710 coupled with a memory 720.

In the present embodiment, the apparatus 700 implements a network entity, and the memory 720 comprises computer readable program instructions, that, when executed by the processor 710, cause the apparatus 700 to receive, from a NEF, information associated with at least one of: one or more requested UP capability groups for the first App-ID and one or more requested UP capabilities for the first App-ID. The apparatus 700 is further caused to store, the requested at least one of one or more UP capability groups for the first App-ID and one or more UP capabilities for the first App-ID.

In some embodiments, prior to receiving information associated with at least one of: one or more requested UP capability groups for the first App-ID and one or more requested UP capabilities for the first App-ID and storing the requested at least one of one or more UP capability groups for the first App-ID and one or more UP capabilities for the first App-ID, the apparatus 700 may be further caused to provide, to the NEF, information associated with at least one of: available UP capability groups and available UP capabilities upon a request by the AF to the NEF.

In these embodiments, the apparatus 700 may be caused to provide the information associated with available UP capability groups and available UP capabilities from the network entity by:

receiving a query request message from the NEF, the query request message including an indication to retrieve the information associated with available UP capability groups and available UP capabilities; and
  providing, in a query response message, the information associated with available UP capability groups and available UP capabilities from the network entity to the NEF.

In some embodiments, the apparatus 700 may be caused to provide the information associated with available UP capability groups and available UP capabilities to the NEF based on the at least one of one or more target App-IDs and identifiers of one or more users to which a fetch request from the AF applies. Also, in some embodiments, the apparatus 700 may be caused to provide the information associated with available UP capability groups and available UP capabilities to the NEF based on the information indicating which of the one or more available UP capability groups and/or one or more available UP capabilities is suitable for exposure to third parties.

Furthermore, prior to providing information associated with at least one of: available UP capability groups and available UP capabilities, the apparatus 700 may be caused to receive a first storage request message which comprises the at least one of: one or more available UP capability groups and one or more available UP capabilities for each of one or more App-IDs, and to store the at least one of available UP capability groups and available UP capabilities (e.g. as Application Data). In some embodiments, the first storage request message may further comprise information indicating which of the one or more available UP capability groups and/or one or more available UP capabilities is suitable for exposure to third parties. Furthermore, the first storage request message may further comprise user identifier for each of the at least one of: one or more available UP capability groups and one or more available UP capabilities.

In some embodiments, subsequent to storing the at least one of: one or more available UP capability groups and one or more available UP capabilities, the apparatus 700 may be further caused to provide an indication to indicate that the storage has been successfully performed.

In some embodiments, the information associated with available supported UP capabilities may include a list of available service functions, and one or more available configuration options for each of the plurality of available service functions. In some embodiments, the one or more available configuration options may be associated with at least one of: a type of service function, and a traffic management action. In some embodiments, the available supported UP capabilities may be categorised into groups. For example, even though typically a UP capability is of a certain Service Function (SF) type (e.g. TCP Optimizer SF), UP capabilities in some embodiments may not be of certain SF type, but rather a certain SF category (e.g. Optimizer SF category, which might include TCP Optimizer SF type, QUIC Optimizer SF and/or Video Optimizer SF).

In some embodiments, the information associated with available supported UP capability groups may include a list of available service chains, each of the available service chains being represented by a chain identifier (Chain-ID), and each available service chain may be a combination of ordered service functions.

In some embodiments, the apparatus 700 may be further caused to store identifying information of the AF.

In some embodiments, the apparatus 700 may be caused to store identifying information of the AF and/or the requested at least one of: one or more UP capability groups for the first App-ID and one or more UP capabilities for the first App-ID by:

receiving a second storage request message from the NEF, wherein the second storage request message including the identifying information of the AF and/or the request at least one of: one or more UP capability groups for the first App-ID and one or more UP capabilities for the first App-ID; and
  providing an indication to the NEF to indicate that the storage has been successfully performed.

It will be appreciated that FIG. 7 only shows the components required to illustrate an aspect of the apparatus 700 and, in a practical implementation, the apparatus 700 may comprise alternative or additional components to those shown.

Any appropriate steps, methods, or functions may be performed through a computer program product that may, for example, be executed by the components and equipment illustrated in the figure above. For example, there may be provided a storage or a memory at the apparatus 700 that may comprise non-transitory computer readable means on which a computer program can be stored. The computer program may include instructions which cause the components of the apparatus 700 (or any operatively coupled entities and devices) to execute methods according to embodiments described herein. The computer program and/or computer program product may thus provide means for performing any steps herein disclosed.

Figure 8:
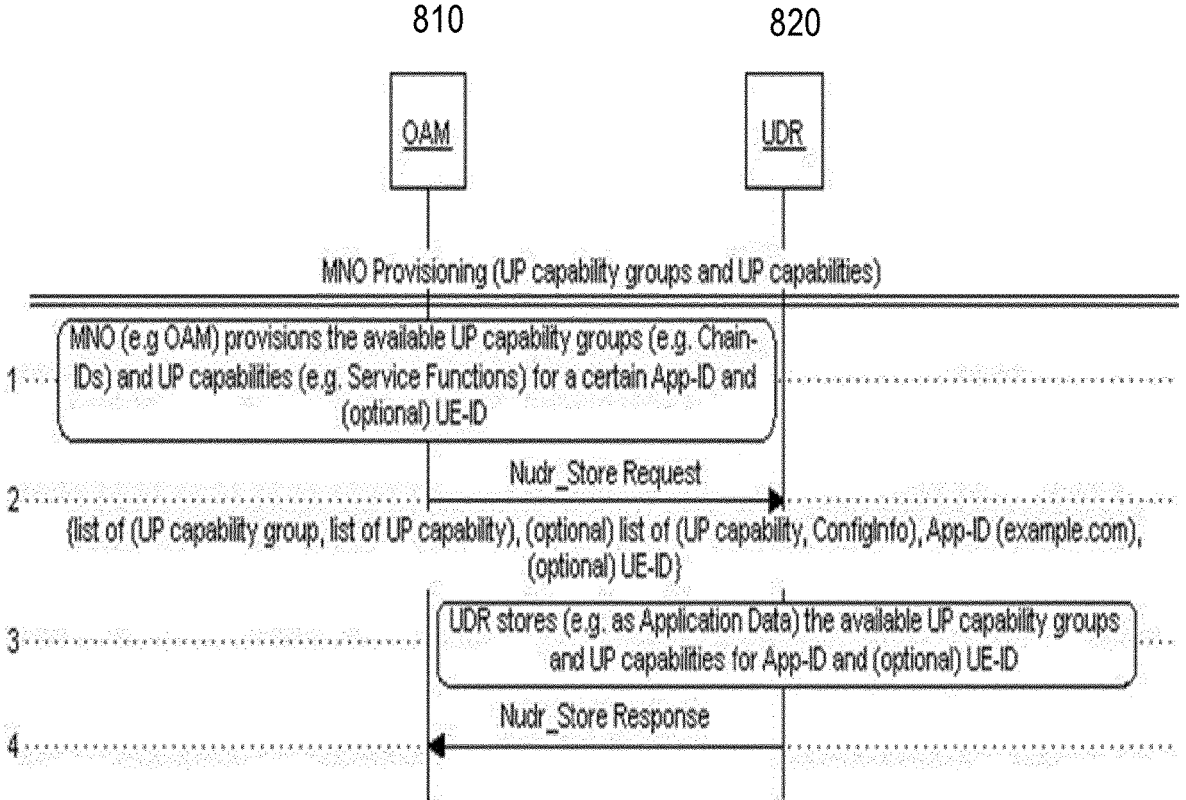
FIG. 8 illustrates, in a sequence diagram, an example of a mechanism for a MNO to provision to network entity the information relative to the supported User Plane capability group(s) and/or UP capability(ies), according to an embodiment of the present disclosure.

FIG. 8 illustrates, in a sequence diagram, an example of a mechanism for a MNO (e.g. Operations, Administration, and Maintenance (OAM)) to provision to a network entity the information relative to the supported User Plane (UP) capability group(s) and/or UP capability(ies), according to an embodiment of the present disclosure. In this example, the MNO stores in a network entity (which is a UDR in this example) the available capability group(s) and/or available UP capability(ies).

In step 1 of FIG. 8, the MNO, which is a OAM 810 in this example, provisions the available UP capability group(s) (e.g. a list of available service chains) and/or the available UP capability(ies) (e.g. a list of available service functions (SFs), and, for each SF, the available configuration options) on a per App-ID basis and, optionally, on a per UE-ID basis. The UP capabilities can be organised in groups (e.g. UP optimisation capabilities). In some embodiments, a tag indicating which UP capability group(s) and UP capability(ies)

are suitable for exposure to third parties (e.g. content providers) may be included. This allows defining a separate set of UP capabilities for exposure and thereby increases security.

In step 2 of FIG. 8, the OAM 810 stores in a Unified Data Repository 820 (UDR) the available UP capabilities group(s) and/or the available UP capability(ies) by triggering a Nudr_Store request message, which includes the following parameters:

A list of (UP capabilities group, list of capability). Optionally, a tag indicating which UP capability group(s) are suitable for exposure to third parties (e.g. content providers) may be included. As an example, the list of capability group(s) may be a list of Chain-IDs (as a filtered set of supported chains, where each chain is a combination of ordered Service Functions).

(Optionally) A list of (UP capability, ConfigInfo). Optionally, a tag indicating which UP capability(ies) and ConfigInfo are suitable for exposure to third parties (e.g. content providers) may be included. As an example, the list of UP capabilities (as a list of Service Functions) supported by the MNO which are exposed to the content provider may be as follows: Transmission Control Protocol (TCP) optimizer, Quick UDP Internet Connections (QUIC) Optimizer, HTTP proxy, QUIC Proxy, Firewall, Traffic Probe, Carrier-grade NAT (CGNAT), or Content Filtering control. For each UP capability (e.g. Service Function), a set of configuration options (ConfigInfo) may be included.

App-ID (example.com), i.e. identifier of the application (Optionally) UE-ID, i.e. identifier of a user In step 3 of FIG. 8, the UDR 820 stores (e.g. as Application Data) the available UP capability group(s) and/or UP capability(ies) (and ConfigInfo) for the App-ID and (optionally) the UE-ID.

In step 4 of FIG. 8, the UDR 820 answers OAM with a Nudr_Store response message indicating successful operation.

Figure 9:
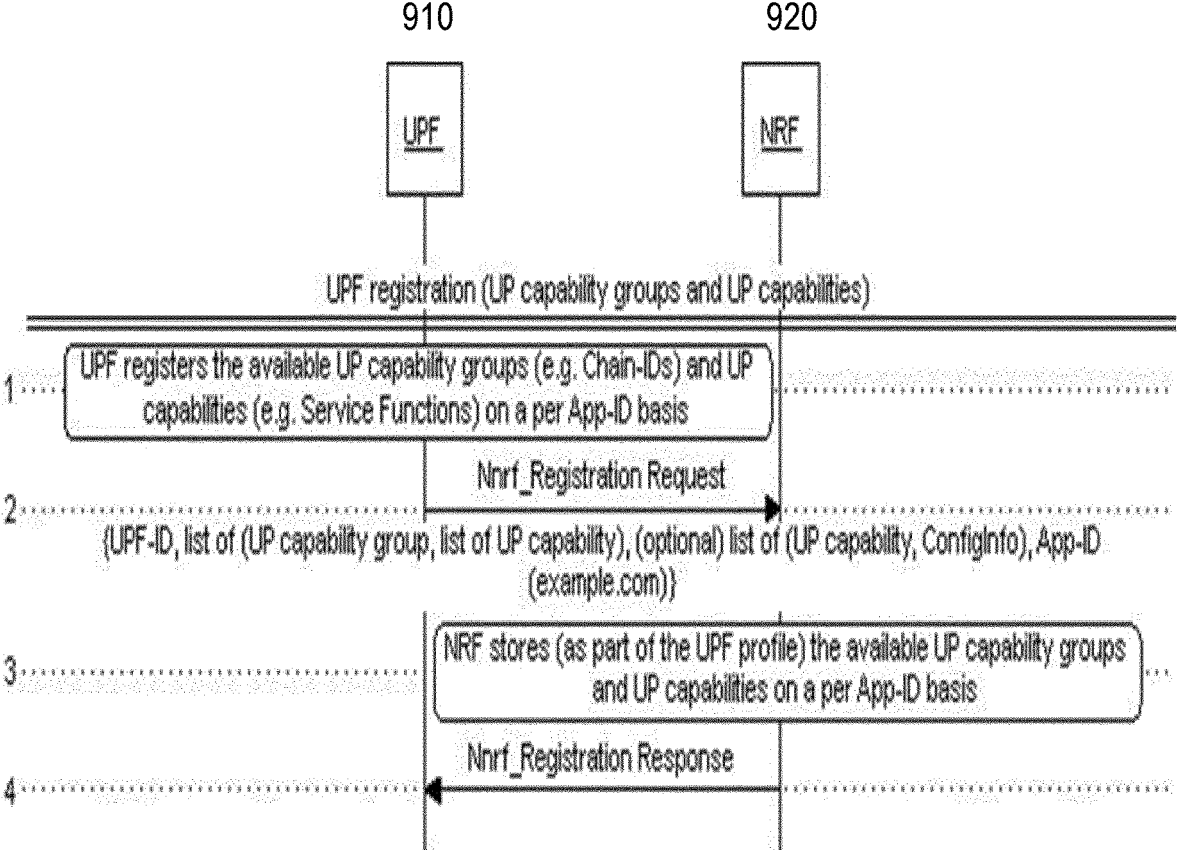
FIG. 9 illustrates, in a sequence diagram, an example of a mechanism for a User Planer Function to register in a Network Repository Function the information relative to the supported UP capability group(s) and/or UP capability(ies)

In some embodiments of the present disclosure, each UPF instance (or the OAM on behalf of the UPF instance) may register in NRF the supported UP capability group(s) (e.g. a list of available service chains) and/or the available UP capability(ies) (e.g. a list of available service functions, and, for each SF, the available configuration options) for that UPF instance. This information may be used for UPF (instance) discovery. For example, a specific UPF instance (e.g. acting as ULCL in the edge) may have some limitations on the supported UP capabilities (e.g. supporting only a subset of global MNO service chains). FIG. 9 illustrates, in a sequence diagram, an example of a mechanism for a User Planer Function (UPF) to register in a Network Repository Function (NRF) the information relative to the supported UP capability group(s) and/or UP capability(ies), according to an embodiment of the present disclosure. In this example, the UPF instance registers in the NRF the available UP capability group(s) and/or the available UP capability(ies).

In steps 1 and 2 of FIG. 9, a UPF 910 registers in a NRF 920 the available UP capability group(s) (e.g. Chain-IDs) and/or UP capability(ies) (e.g. Service Functions) on a per App-ID basis. Specifically, during these steps, the UPF 910 triggers a Nnrf_Registration request message which includes the following parameters:

UPF-ID, i.e. identifier of the UPF

A list of (UP capability group, list of UP capability)

(Optionally) A list of (UP capability, ConfigInfo)

App-ID (example.com), i.e. identifier of the application

In step 3 of FIG. 9, the NRF 920 stores (as part of the UPF profile) the available UP capability group(s) and/or UP capability(ies) and ConfigInfo on a per App-ID basis.

In step 4 of FIG. 9, the NRF 920 answers the UPF 910 with a Nnrf_Registration response message indicating successful operation.

Figure 10:
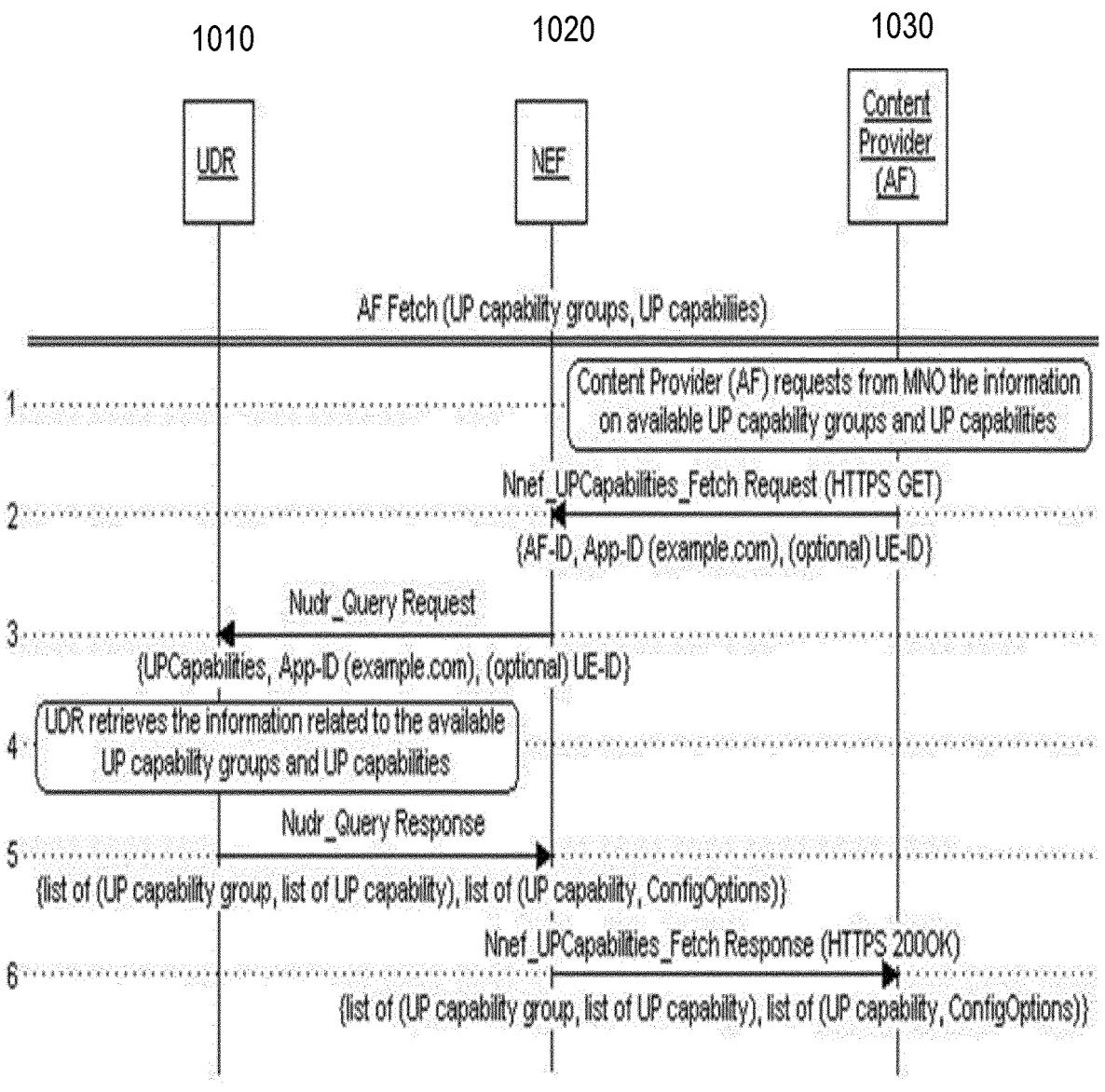
FIG. 10 illustrates, in a sequence diagram, an example of a mechanism for a content provider to retrieve information relative to the supported UP capability(ies), according to an embodiment of the present disclosure.

In some embodiments of the present disclosure, a content provider (e.g. an AF) may request/subscribe to an NEF related to a new service (represented by UP capabilities), so the MNO provides information (only the one suitable for exposure) on the available UP capability group(s) (e.g. a list of available service chains) and on the available UP capabilities (e.g. Service Functions in the N6-LAN, and, for each SF, the available configuration options). Optionally, the content provider might indicate the target App-ID and/or UE-ID (which may refer to an individual user or a group of users). As a result, NEF returns the requested information (which might have been previously stored in a UDR and/or a NRF). FIG. 10 illustrates, in a sequence diagram, an example of a mechanism for a content provider to retrieve information relative to the supported UP capability(ies), according to an embodiment of the present disclosure. In this example, the content provider retrieves information on the MNO available UP capability group(s) and/or available UP capability(ies) on a per App-ID and per UE-ID basis.

In steps 1 and 2 of FIG. 10, the content provider, which in this example is AF 1030, requests from the MNO the information on supported UP capability group(s) and/or UP capability(ies). Specifically, during these steps, the AF 1030 triggers towards a NEF 1020 a Nnef_UPCapabilities_Fetch request message (HTTPS GET), including the following information:

AF-ID, i.e. identifier of the content provider (Optionally) A list of App-ID representing target App-ID(s) (e.g. App-ID=example.com). When this parameter is not present, a target list of App-IDs can still be a parameter to be considered if there is a default configuration for the AF-ID.

(Optionally) The user(s) for which the request applies to, represented by: UE-ID, or a list of UE-IDs, a UE-Group-ID, or a list of UE-Group-IDs, or AnyUE (indicating any user). When this parameter is not present, target users may still be a parameter to be considered if there is a default configuration for the AF-ID.

In step 3 of FIG. 10, the NEF 1020 retrieves the requested information from a UDR 1010. Specifically, during this step, the NEF 1020 triggers towards the UDR 1010 a Nudr_Query request message by including an indication (e.g. UPCapabilities) to retrieve the information on supported UP capability group(s) and/or UP capability(ies) for the target App-ID and optionally the UE-ID.

In steps 4 and 5 of FIG. 10, the UDR 1010 retrieves the information related to the supported UP capability groups and/or UP capabilities and triggers a Nudr_Query response messages towards the NEF 1020 by including the following information:

A list of (UP capability group, a list of UP capability). In some embodiments, the UDR 1010 may only retrieve UP capability group(s) which are suitable for exposure to third parties (e.g. content providers) according to tag(s) as mentioned above with reference to the sequence diagram of FIG. 8. As an example, the list of UP capability groups may be a list of Chain-IDs as a filtered set of supported chains, each chain being a combination of ordered Service Function. As a more specific example, this may include Chain #1 which includes TCP Optimizer and CGNAT, Chain #2 which includes QUIC Optimizer and CGNAT, etc. These chains may be preconfigured at the MNO 5GC and pre-programmed in the N6-LAN and correspond to sensible combination of SFs (e.g. TCP Optimizer and QUIC Optimizer are mutually exclusive so they would not be programmed as part of the same chain).

(Optionally) A list of (UP capability, ConfigInfo). In some embodiments, the UDR 1010 may only retrieve UP capabilities and ConfigInfo which are suitable for exposure to third parties (e.g. content providers) according to tag(s) as mentioned above with reference to the sequence diagram of FIG. 8. As an example, the list of UP capabilities may be a list of Service Functions, e.g. TCP Optimizer, QUIC Optimizer, HTTP proxy, QUIC proxy, Firewall, Traffic Probe, CGNAT or Content Filtering control. For each item in the list, a set of configuration options (ConfigOptions) which apply to each specific Function may also be provided. If the target App-ID and/or the UE-ID are provided, the list may be filtered accordingly. Even these are not provided by the NEF 1020, they may be included in the request to the UDR 1010 based on, for example, default settings for the specific Content Provider (represented by AF-ID). As an example, in the case of Content Filtering control:

Type: Parental control/IWF (urls)/both, and within parental control, categories for filtering like Adult or Violence Traffic Management Action: Block, Redirect, Notify user In step 6 of FIG. 10, the NEF 1020 triggers towards the AF 1030 a Nnef_UPCapabilities_Fetch response message (HTTPS 200OK) indicating successful operation including the same information received in step 5 as described above.

In some embodiments, in case of a subscribe operation, the NEF 1020 may notify the AF 1030 whenever there is a change in the supported UP capabilities.

Figure 11:
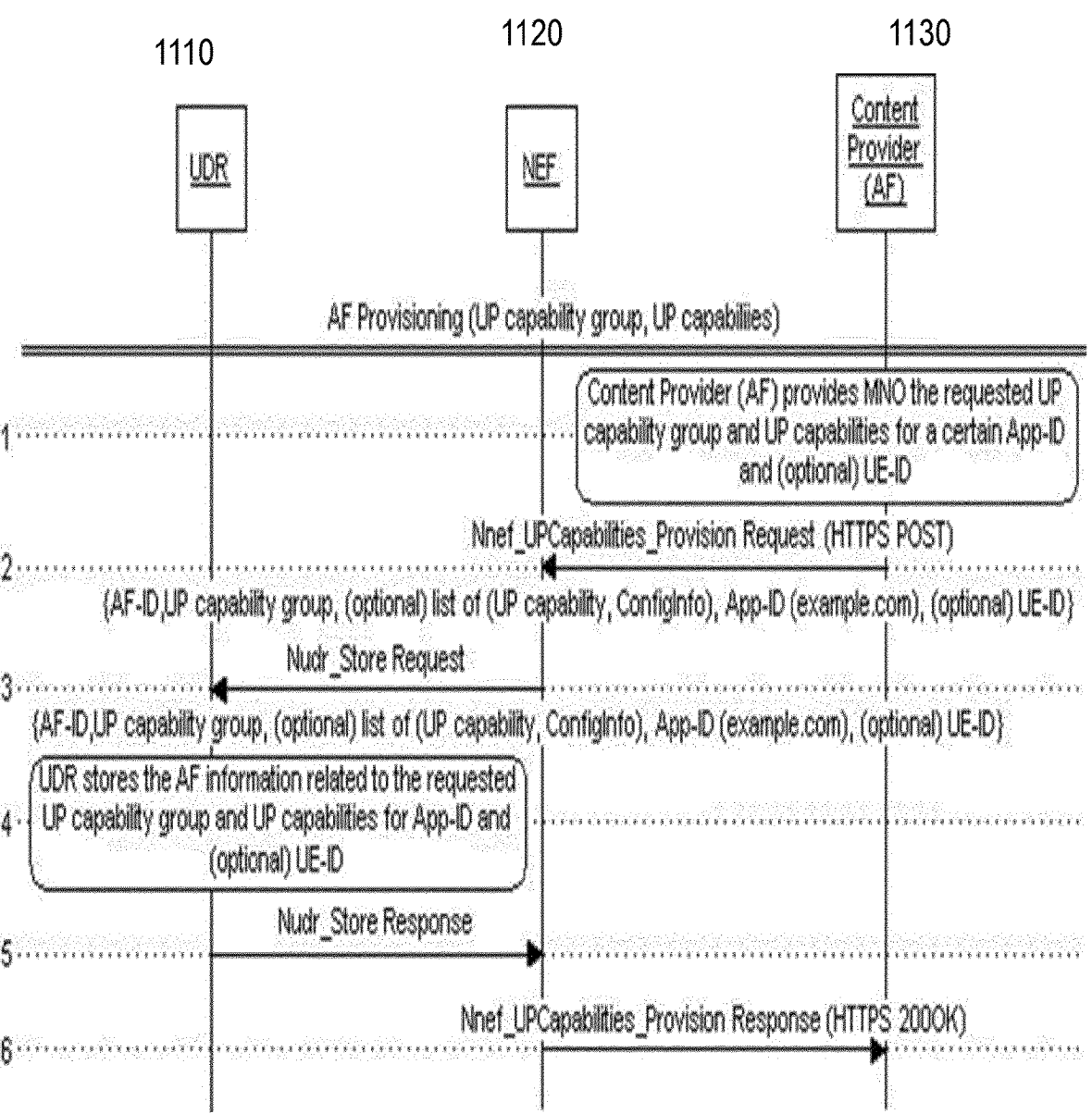
FIG. 11 illustrates, in a sequence diagram, an example of a mechanism for a content provider to request the UP capability(ies) to be applied, according to an embodiment of the present disclosure.

Based on the information received using the request/subscription as described above, or by other means (e.g. as part of the SLA), the content provider (e.g. AF) can provide the MNO with the UP capability group(s) it wants to request for a certain App-ID and, optionally, a UE-ID (which may refer to an individual user or a group of users. FIG. 11 illustrates, in a sequence diagram, an example of a mechanism for a content provider to request the UP capability(ies) to be applied, according to an embodiment of the present disclosure. In this example, the content provider (which is an AF 1130) provide the MNO the requested UP capability group(s) and/or requested UP capability(ies) for a certain App-ID and UE-ID.

In steps 1 and 2 of FIG. 11, the AF 1130 provides the MNO with the requested UP capability group(s) and/or requested UP capability(ies) for a certain App-ID, and optionally a UE-ID. Specifically, during these steps, the AF 1130 triggers towards a NEF 1120 a Nnef_UPCapabilities_Provision request message (HTTPS POST), which includes the following information:

AF-ID, i.e. identifier of the content provider

UP capability group, i.e. the AF-requested UP capability group (for example represented by a Chain-ID). In some embodiments, the content provider (i.e. the AF 1130 in this example) may request a UP capability group (e.g. represented by a Chain-ID) from the list of MNO-supported UP capability group(s) (e.g. represented by Chain-IDs). Alternatively, in some embodiments the content provide may request a UP capability group that is not in the list of MNO-supported UP capability groups, by including a tailored set of UP capability(ies) (e.g. Service Functions). In this case, the MNO may accept or reject the request. If the MNO accepts the request, the MNO may take the necessary actions to update the 5GC configuration and to program the new UP capability group (e.g. represented by a new Chain-ID) according to the request. This may involve orchestration.

(Optionally) A list of (UP capability. ConfigInfo). This may be included when the content provider wants to configure specific UP capability(ies) (e.g. Service Function(s)) in the requested UP capability group (e.g. represented by a Chain-ID). In this case, the configuration information (ConfigInfo) which applies to a specific UP capability (e.g. Service Function) is provided by the content provider. As an example, in the case of Content Filtering control:

Type: Parental control (and request to filter for Adult category only)

Traffic Management Action: Block Predefined default settings may be applied when the ConfigInfo is not provided for a UP capability (e.g. Service Function)

A list of App-IDs representing the target App-IDs (e.g. App-ID=example.com)

(Optionally) The user(s) for which the request applies to, represented by: UE-ID, or a list of UE-IDs, a UE-Group-ID, or a list of UE-Group-IDs, or AnyUE (indicating any user). When this parameter is not present, target users may still be a parameter to be considered if there is a default configuration for the AF-ID.

In steps 3 and 4, the NEF 1120 stores the information received in step 2 above in the UDR 1110. Specifically, during these steps, the NEF 1120 triggers towards a UDR 1110 a Nudr_Store request message by including the same information as described with reference to step 2 above.

In step 5, the UDR 1110 answers the NEF 1120, indicating successful operation by means of triggering a Nudr_Store response message.

In step 6, the NEF 1120 answer the AF 1130, indicating successful operation by means of triggering a Nnef_UPCapabilities_Provision response (HTTPS 200OK).

It is noted that the above procedure (e.g. HTTPS POST) might be triggered before/after the PDU Session for the UE-ID is established. Furthermore, in some embodiments the AF 1130 may update (e.g. HTTPS PUT) or remove (HTTPS DELETE) the requested UP capability group(s) (e.g. represented by Chain-IDs and/or Service Functions).

Figure 12A:
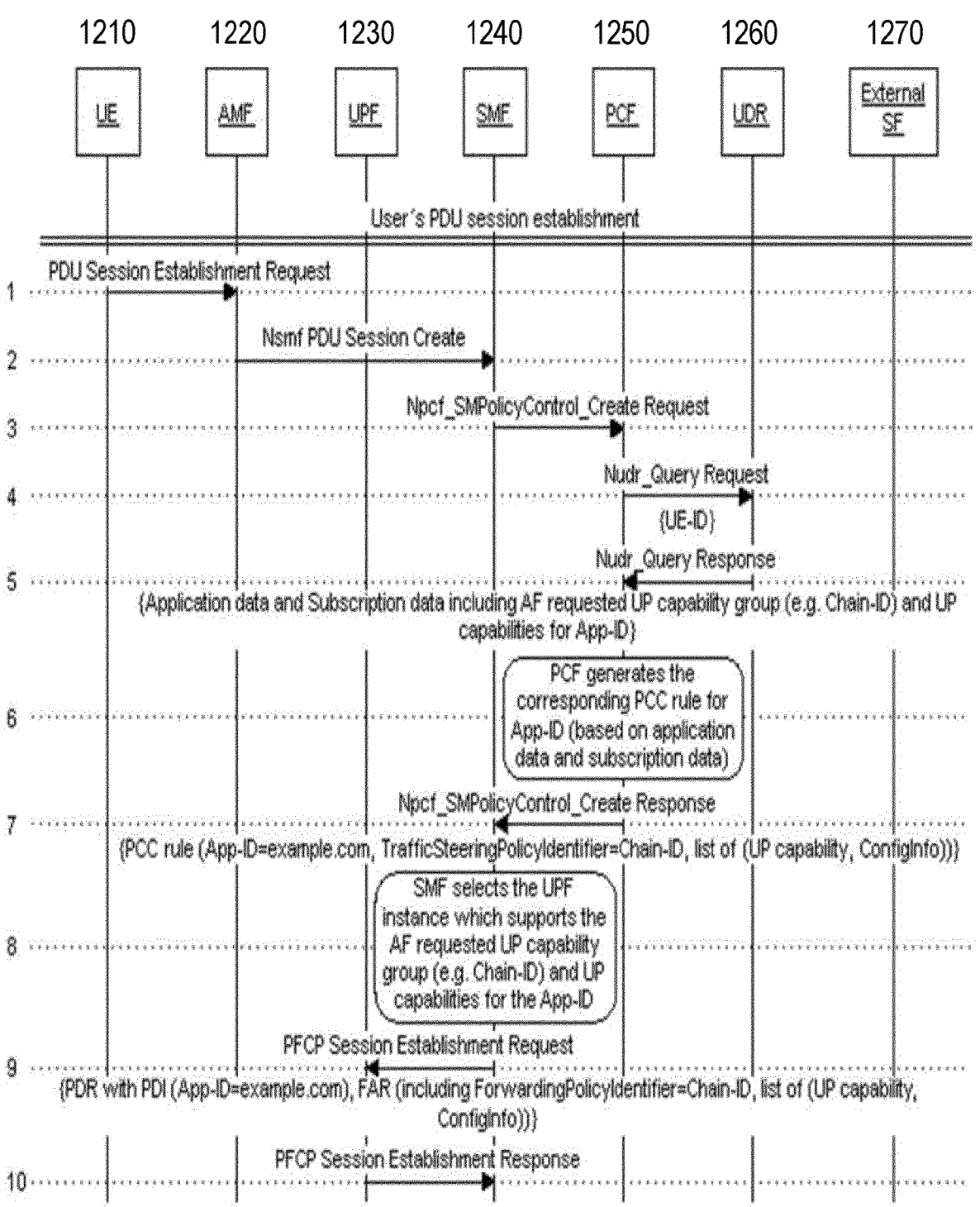
FIGS. 12A and 12B illustrate, in a sequence diagram, an example of a use case in which a content provider requests UP capability(ies) for a certain user application session, according to an embodiment of the present disclosure.
Figure 12B:
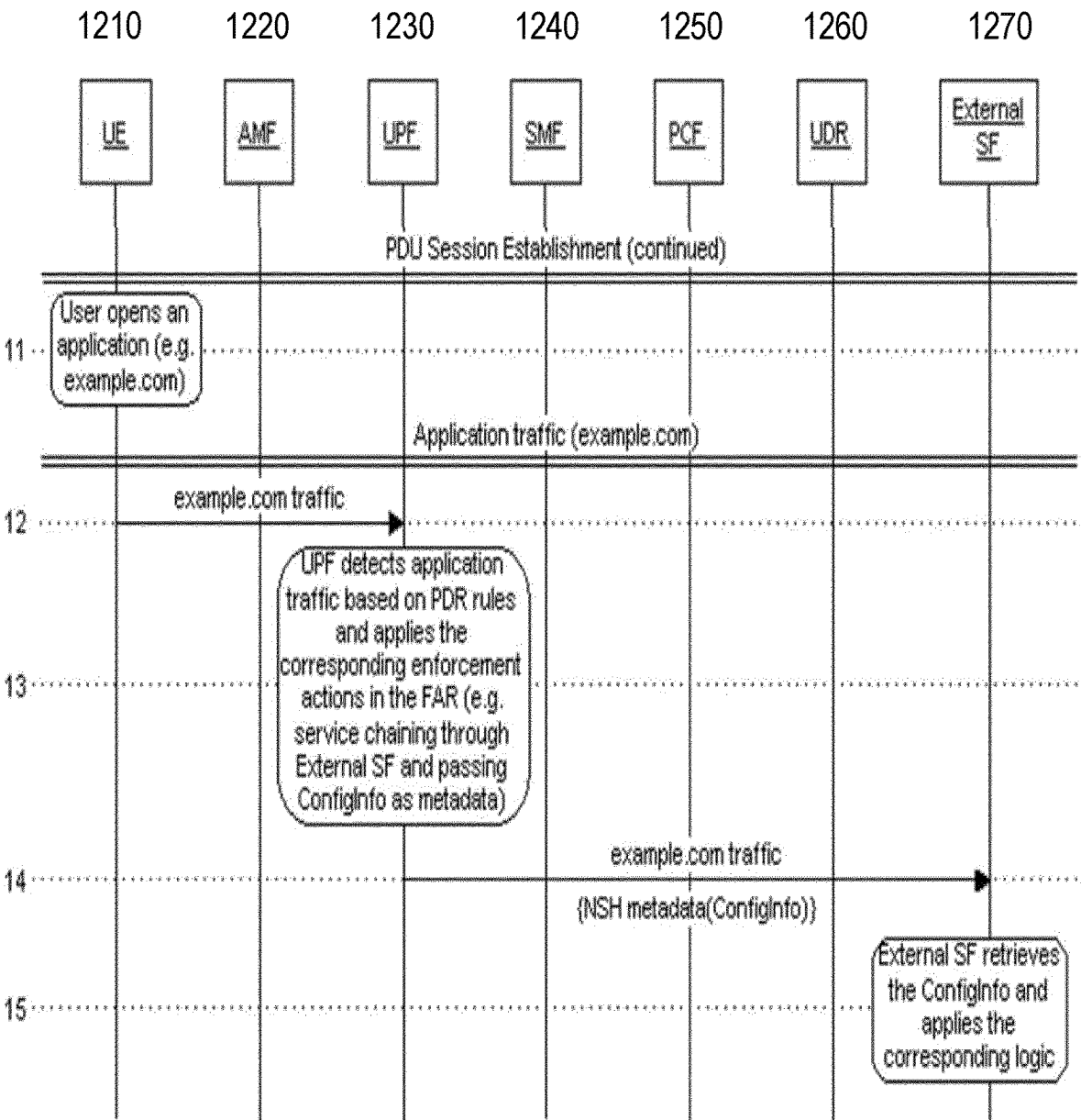

FIGS. 12A and 12B illustrate, in a sequence diagram, an example of a use case in which a content provider requests UP capability(ies) for a certain user application session, according to an embodiment of the present disclosure. In this example, the MNO configures the requested UP capability group(s) and/or the requested UP capability(ies) for a certain App-ID and UE-ID.

FIGS. 12A and 12B show an example of how a MNO can configure the AF-requested Service Chaining for a App-ID and UE-ID session. It will be appreciated that in other embodiments other mechanisms for performing such configuration. The example shown is one based on N7/N4 extensions, and it may be possible to perform such configuration for example by PCF reusing/extending the St interface towards the SFC controller.

In step 1 of FIG. 12A, a UE 1210 triggers a PDU session establishment by means of sending a PDU Session Establishment Request to an Access and Mobility Function (AMF) 1220. It is noted that in the sequence diagram of FIGS. 12A and 12B, not all the signaling messages involved in the PDU Session Establishment procedure.

In step 2 of FIG. 12A, the AMF 1220 selects a Session Management Function (SMF) 1240 to manage the PDU session and triggers a Nsmf_PDUSession_Create request message.

In step 3 of FIG. 12A, the SMF 1240 selects a Policy Control Function (PCF) 1250 and triggers a Npcf_SMPolicyControl_Create request message to retrieve Session Management (SM) policies for the user PDU session.

In step 4 of FIG. 12A, the PCF 1250 triggers a Nudr_Query request message to retrieve the policy data for this user's PDU session by indicating the UE-ID.

In step 5 of FIG. 12A, a UDR answers with a Nudr_Query message with Application Data and Subscription Data including AF-requested UP capability group(s) (e.g. represented by Chain-ID(s)) and/or UP capability(ies) for the App-ID. It is noted that a UDR 1260 may have also stored the MNO default UP capability group(s) and/or UP capability(ies) for the App-ID and for the subscriber.

In steps 6 and 7 of FIG. 12A, the PCF 1250 generates the corresponding Policy and Charging Control (PCC) rule for the App-ID (e.g. represented by "example.com"), based on Application Data and Subscription Data. This generation operation may take into account the AF-requested UP capability group(s) and/or UP capability(ies). The PCF 1250 installs in the SMF 1240 a PCC rule of the App-ID by triggering a Npcf_SMPolicyControl_Create response message including the following information:

PCC Rule:
    App-ID=example.com
    TrafficSteeringPolicyIdentifier=Chain-ID
    A list of (UP capability, (new) ConfigInfo)

In step 8 of FIG. 12A, the SMF 1240 selects a UPF instance which supports the AF-requested UP capability group(s) (e.g. represented by a Chain-ID) and/or UP capability(ies) for the App-ID. This selection is based on the previous UPF registration procedure as described with reference to FIG. 9. It is noted that the SMF 1240 may also consider the existing UPF capabilities in the Network Function (NF) profile (upfInfo), e.g. atsss capability, dataForwarding, etc.

In step 9 of FIG. 12A, based on the PCC rule mentioned above with reference to steps 6 and 7, the SMF 1240 generates and installs in a UPF 1230 the following rule for the APP-ID (e.g. represented by "example.com") in a Packet Forwarding Control Protocol (PFCP) Session Establishment request message:

Packet Detection Rule (PDR) with Packet Detection Information (PDI) type App-ID, e.g. "example.com"
Forwarding Action Rule (FAR) (including ForwardingPolicyIdentifier=Chain-ID, a list of (UP capability, (new) ConfigInfo)

In step 10 of FIG. 12A, the UPF 1230 answers the SMF 1240 with a successful PFCP Session Establishment response message.

In steps 11 and 12 of FIG. 12B, the user opens an application (e.g. "example.com") and the UE 1210 triggers application traffic towards an Application Server.

In steps 13 and 14 of FIG. 12B, the UPF 1230 detects application traffic based on Packet Detection Rules (PDRs) and applies the corresponding enforcement actions in the FAR (e.g. service chaining through an External SF 1270 and passing ConfigInfo as metadata, e.g. in Network Service Header (NSH)).

In step 15 of FIG. 12B, the external SF 1270 retrieves the ConfigInfo (e.g. from NSH) and applies the corresponding logic.

The procedure described above is one that may apply to new PDU sessions. Moreover, the AF request can be applied to ongoing PDU sessions if desired (e.g. the user session content may be updated to include the AF-requested UP capability group(s) and/or the UP capability(ies) for the App-ID). The PCF 1250 has to be subscribed to UDR changes through available mechanisms. In this case, the procedure may start from step 6 of FIG. 12A and it is noted that the following changes may apply:

It is a UDR notification that triggers the procedure of step 6 of FIG. 12A. Steps 6 and 7 of FIG. 12A are executed based on the information update receive from the UDR, and the new PCC rule(s) are provided to the SMF 1240 as part of a PDU SM Policy Update instead. It is further noted that this may involve a UPF re-selection The SMF 1240 proceeds as described in steps 8 and 9 as explained above, but rather than a PFCP Session Creation, the rules would be provided to the UPF 1230 as part of a PFCP Session Update The operations would remain the same from step 10 of FIG. 12A Configuration Options As the configuration options (ConfigOptions) depend on the specific UP capability, the following may be proposed:

For UP capability=Content Filtering:
    Type: Parental control/IWF (urls)/both, and within parental control, categories for filtering like Adult or Violence
    Traffic Management Action: Block, Redirect, Notify user For UP capability=Traffic Optimization:
    Type (of traffic to optimize): e.g. optimize all traffic, optimize only video streaming traffic
    Protocol: selected protocol to optimize (e.g. HTTP, TCP, UDP, QUIC)
    Traffic Management Action: e.g. optimize for speed, optimize for latency For UP capability=Proxy
    Type: TCP Proxy, TLS Proxy, DNS Proxy, HTTP Proxy or QUIC Proxy
    Proxy capabilities (e.g. traffic acceleration)

For UP capability=Firewall
    Type: to prevent generic attacks or specific attacks (e.g. DDoS), prevent attacks originated from UE and/or network, etc.

For UP capability=CGNAT
    Type: IPv4, IPv6, ALG

Finally, the technique described herein does not only apply to 5G network architecture, but the same mechanisms can be applied to 4G. This may be possible by making the following replacements:

AF by Service Capability Server/Application Server (SCS/AS)
NEF by Service Capability Exposure Function (SCEF)
PCF by PCRF
SMF by PGW-C or Traffic Detection Function-Control Plane (TDF-C)
UPF by PGW-U or Traffic Detection Function-User Plane (TDF-U)

Embodiments of the disclosure thus propose methods, apparatuses, and systems for enable an Application Function to request User Plane capabilities of a Mobile Network Operator, thereby allowing third parties to request utilisation of specific service function and service function chaining for their applications. Specifically, the proposed technique allows a content provider to request, configure, and control the MNO's user plane capabilities (e.g. a chain of service functions in the N6-LAN) both on a per application and on a per user session basis.

The above disclosure sets forth specific details, such as particular embodiments or examples for purposes of explanation and not limitation. It will be appreciated by one skilled in the art that other examples may be employed apart from these specific details.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

Abbreviations

| Abbreviation | Explanation |
| --- | --- |
| 5GC | Fifth Generation Core |
| AMF | Access and Mobility Function |
| AS | Application Server |
| CP | Content Provider |
| DL | Downlink |
| DPI | Deep Packet Inspection |
| FAR | Forwarding Action Rule |
| FMSS | Flexible Mobile Service Steering |
| HTTP | Hypertext Transport Protocol |
| HTTPS | Hypertext Transport Protocol Secure |
| IE | Information Element |
| IWF | Internet Watch Foundation |
| LAN | Local Area Network |
| MNO | Mobile Network Operator |
| PCRF | Policy and Charging Rule Function |
| PDI | Packet Detection Information |
| PDN | Packet Data Network |
| PDR | Packet Detection Rule |
| PFCP | Packet Flow Control Protocol |
| PFD | Packet Flow Description |
| PGW | Packet Gateway |
| QoS | Quality of Service |
| RAN | Radio Access Network |
| SDF | Service Data Flow |
| SDN | Software Defined Networking |
| SF | Service Function |
| SFC | Service Function Chaining |
| SMF | Session Management Function |
| SUPI | Subscription Permanent Identifier |
| UDR | Unified Data Repository |
| UE | User Equipment |
| UL | Uplink |
| ULCL | Uplink Classifier |
| UP | User Plane |
| UPF | User Plane Function |
| URL | Universal Resource Locator |
| URR | Usage Reporting Rule |

The invention claimed is:

1. A computer-implemented method at a Network Exposure Function (NEF) for enabling an Application Function (AF) to request User Plane (UP) capabilities of a Mobile Network Operator (MNO), the method comprising:
   receiving a request from the AF for at least one of:
      one or more UP capability groups for a first application identifier (App-ID); and
      one or more UP capabilities for the first App-ID;
   providing, to a network entity, information associated with the at least one of the one or more UP capability groups for the first App-ID and the one or more UP capabilities for the first App-ID;
   providing an indication to the AF to indicate that the request for the at least one of the one or more UP capability groups for the first App-ID and the one or more UP capabilities for the first App-ID has been accepted, when the at least one of the one or more UP capability groups for the first App-ID and the one or more UP capabilities for the first App-ID is stored in the network entity.

2. The computer-implemented method of claim 1, wherein receiving the request from the AF comprises receiving a provision request message from the AF, wherein the provision request message comprises:
   an identifier of the AF;
   a list of target App-IDs; and
   the at least one of the one or more UP capability groups for the first App-ID and a predetermined set of UP capabilities.

3. The computer-implemented method of claim 2, wherein the provision request message further comprises identifiers of one or more users to which the provision request applies.

4. The computer-implemented method of claim 1, wherein prior to requesting the one or more UP capability groups for the first App-ID and/or the one or more UP capabilities for the first App-ID, the computer-implemented method further comprises:

retrieving, from the network entity and responsive to a request by the AF, information associated with at least one of:

available UP capability groups; and available UP capabilities; and providing, to the AF, the information associated with the at least one of the available UP capability groups and the available UP capabilities.

5. The computer-implemented method of claim 4, wherein retrieving the information associated with the available UP capability groups and the available UP capabilities from the network entity comprises:

triggering a query request message to the network entity, wherein the query request message comprises an indication to retrieve the information associated with the available UP capability groups and the available UP capabilities; and receiving, in a query response message, the information associated with the available UP capability groups and the available UP capabilities from the network entity.

6. The computer-implemented method of claim 4, wherein the request from the AF for information associated with the at least one of the available UP capability groups and the available UP capabilities comprises a fetch request message that includes an identifier of the AF.

7. The computer-implemented method of claim 6, wherein the fetch request message further includes at least one of one or more target App-IDs and identifiers of one or more users to which the fetch request applies.

8. The computer-implemented method of claim 7, wherein retrieving the requested information associated with at least one of the available UP capability groups and the available UP capabilities comprises retrieving the information based on the at least one of the one or more target App-IDs and the identifiers of the one or more users to which the fetch request applies in the fetch request message.

9. The computer-implemented method of claim 4, wherein the information associated with the available UP capabilities is information associated with supported available UP capabilities and comprises:

a list of available service functions; and one or more available configuration options for each of the plurality of available service functions.

10. The computer-implemented method of claim 9, wherein the one or more available configuration options are associated with at least one of:

a type of service function; and a traffic management action.

11. The computer-implemented method of claim 9, wherein the available supported UP capabilities may be categorized into groups comprising one of:

a Service Function (SF) type; and a SF category.

12. The computer-implemented method of claim 11, wherein the SF category comprises:

a TCP Optimizer SF type; and/or a QUIC Optimizer SF; and/or a Video Optimizer SF.

13. The computer-implemented method of claim 9, wherein the information associated with available supported UP capability groups comprises a list of available service chains, wherein each available service chain is represented by a Chain-ID and is a combination of ordered service functions.

14. The computer-implemented method of claim 1, further comprising:

providing a second storage request message to the network entity, wherein the second storage request message comprises:

the identifying information of the AF; and/or the request for at least one of the one or more UP capability groups for the first App-ID and the one or more UP capabilities for the first App-ID; and receiving an indication from the network entity indicating that the storage has been successfully performed.

15. The computer-implemented method of claim 1, wherein the network entity comprises a Unified Data Repository (UDR).

16. An apparatus configured to implement a Network Exposure Function (NEF), the apparatus comprising:

processing circuitry; and a memory communicatively coupled to the processing circuitry, the memory comprising computer readable program instructions, that, when executed by the processing circuitry, causes the apparatus to:

receive a request from an Application Function (AF) for at least one of:

one or more User Plane (UP) capability groups for a first application identifier (App-ID); and one or more UP capabilities for the first App-ID;

provide, to a network entity, information associated with the at least one of the one or more UP capability groups for the first App-ID and the one or more UP capabilities for the first App-ID; and provide an indication to the AF to indicate that the request for the at least one of the one or more UP capability groups for the first App-ID and the one or more UP capabilities for the first App-ID has been accepted when the at least one of the one or more UP capability groups for the first App-ID and the one or more UP capabilities for the first App-ID is stored in the network entity.

17. A non-transitory computer readable medium having computer program code stored thereon that, when executed by processing circuitry of an apparatus configured to implement a Network Exposure Function (NEF), causes the apparatus to:

receive a request from an Application Function (AF) for at least one of:

one or more User Plane (UP) capability groups for a first application identifier (App-ID); and one or more UP capabilities for the first App-ID;

provide, to a network entity, information associated with the at least one of the one or more UP capability groups for the first App-ID and the one or more UP capabilities for the first App-ID; and provide an indication to the AF to indicate that the request for the at least one of the one or more UP capability groups for the first App-ID and the one or more UP capabilities for the first App-ID has been accepted when the at least one of the one or more UP capability groups for the first App-ID and the one or more UP capabilities for the first App-ID is stored in the network entity.

* * * * *